Patented June 16, 1942

2,286,884

UNITED STATES PATENT OFFICE 2,286,884

MANUFACTURE OF 2-METHYL-2-ALKOXY-3-HALOGEN TETRAHYDROFURANES

Kurt Westphal, Wuppertal-Vohwinkel, and Hans Andersag, Wuppertal-Elberfeld, Germany, assignors to Winthrop Chemical Company, Inc., New York, N. Y., a corporation of New York No Drawing. Application December 27, 1939, Serial No. 311,126. In Germany January 7, 1939

15 Claims. (Cl. 260—345)

This invention relates to processes of manufacturing tetrahydrofurane derivatives, more particularly it relates to the manufacture of 2-methyl-2-alkoxy-3-halogen-tetrahydrofuranes.

In accordance with the present invention the said 2-methyl-2-alkoxy-3-halogen-tetrahydrofuranes are obtainable by reacting upon an 1-halogen-1-acyloxyethyl-acetone, the 1-carbon atom of which is further substituted by one aceto or carbalkoxy radical, in the presence of a lower alcohol and of a small quantity of water with a mineral acid. During this reaction the one aceto radical, the carbalkoxy radical respectively, is split off, the acyloxyethyl radical reacts with the second keto group present in the starting material while forming a furane-ring with splitting off of the acyl radical and with simultaneous entering of the radical of the alcohol serving as the solvent into the 2-position of the tetrahydrofurane compound formed. The reaction, for instance, performs when using sulfuric acid and ethanol as the solvent according to the following reaction scheme:

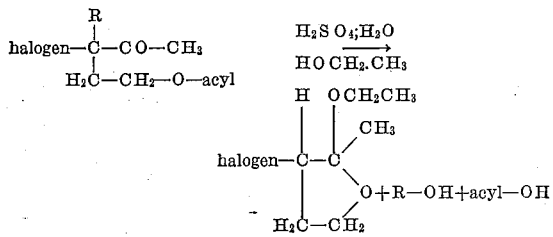

In the formulae R stands for the aceto or carbalkoxy radical.

Accordingly, by the action of an aqueous solution of a mineral acid in an alcohol upon an 1-halogen-1-acyloxyethylacetone, the 1-position of which is further substituted by an aceto or carbalkoxy radical, 2-methyl-2-alkoxy-3-halogen-tetrahydrofuranes are obtained in a very convenient manner. It results that in only one operation the 1-aceto group, the carboxyalkyl group, respectively, is split off, the acyloxyethyl group is saponified and the 2-methyl-2-alkoxy-3-halogen-tetrahydrofurane is formed with the entering of one molecule of alcohol. As the mineral acid advantageously aqueous sulfuric acid is used, but also other mineral acids, such as hydrochloric and hydrobromic acid may be used. Preferably the lower alcohols, such as methyl-, ethyl-, propyl-alcohol and the like are used as the solvent. The halogen atom in the starting material may be for instance chlorine and bromine. The reaction performs already at moderate temperatures. The reaction product is isolated from the reaction mixture for instance by treating the mixture with an indifferent organic solvent, such as ether and benzene, removing acid components from the solution obtained and separating the reaction product in the usual manner. The reaction mixture may also be poured into excess aqueous alkali, for instance sodium carbonate solution and the reaction product which is slightly soluble in water separated in the usual manner. The reaction product is not very stable to dilute aqueous acids which, therefore, should be avoided in the working up of the reaction mixture.

The starting materials may be obtained by reacting upon acetoacetone or upon acetoacetic ester with an acyloxyethyl halide in the presence of alkali metal carbonate and halogenating the 1-aceto or the 1-carbalkoxy-1-acyloxyethyl-acetone for instance by means of sulfurylhalide.

The invention is illustrated by the following examples without being restricted thereto:

Example 1

30 grams of 3-chloro-3-(β-acetoxyethyl)-pentanedion-(2.4) are heated while stirring during 6 hours to 70° C. with 60 cc. of a mixture consisting of 80 grams of absolute alcohol, 20 cc. of water and 30 grams of concentrated sulfuric acid. The mixture is thereupon treated with ether until two layers have been formed. The etheral layer is washed neutral with saturated potassium carbonate solution and dried by way of sodium sulfate. The residue of the ethereal solution boils under 10 mm. pressure at 58° C. The 2-methyl-2-ethoxy-3-chloro-tetrahydrofurane is thus obtained as a thinly liquid oil with a menthol-like odor.

Example 2

46 grams of α-chloro-α-acetoxyethyl-acetoacetic acid ethyl ester are heated to 60–70° C. during 8 hours with 100 cc. of a mixture of 80 grams of absolute alcohol, 20 cc. of water and 30 grams of concentrated sulfuric acid. After cooling the mixture is treated with ether, until two layers have been formed. The lower layer is discarded. The ethereal layer is washed neutral with saturated potassium carbonate solution and dried by way of sodium sulfate. The residue of the ethereal solution boils under 10 mm. pressure at 58° C. The 2-methyl-2-ethoxy-3-chloro-tetrahydrofurane is obtained as a thinly liquid oil with a menthol-like odor.

We claim:

1. The process of producing 2-methyl-2-alkoxy-3-halogen-tetrahydrofuranes which comprises reacting upon a compound of the formula $$\begin{array}{c} \text{halogen} \\ | \\ \text{R—C—CO.CH}_3 \\ | \\ \text{CH}_2\text{—CH}_2\text{—O—acyl} \end{array}$$

wherein R stands for a radical selected from the group consisting of the aceto and carbalkoxy groups and "acyl" is the radical of a carboxyacyl acid with a lower alcohol and a small quantity of water and a mineral acid.

2. The process of producing 2-methyl-2-alkoxy-3-halogen-tetrahydrofuranes which comprises reacting upon a compound of the formula $$\begin{array}{c} \text{halogen} \\ | \\ \text{R—C—CO.CH}_3 \\ | \\ \text{CH}_2\text{—CH}_2\text{—O—acyl} \end{array}$$

wherein R stands for a radical selected from the group consisting of the aceto and carbalkoxy groups and "acyl" is the radical of a carboxyacyl acid with a lower alcohol and a small quantity of water and sulfuric acid.

3. The process of producing 2-methyl-2-alkoxy-3-halogen-tetrahydrofuranes which comprises reacting upon a compound of the formula $$\begin{array}{c} \text{halogen} \\ | \\ \text{H}_3\text{C—CO—C—CO.CH}_3 \\ | \\ \text{CH}_2\text{—CH}_2\text{—O—acyl} \end{array}$$

wherein "acyl" is the radical of a carboxyacyl acid with a lower alcohol and a small quantity of water and a mineral acid.

4. The process of producing 2-methyl-2-alkoxy-3-halogen-tetrahydrofuranes which comprises reacting upon a compound of the formula $$\begin{array}{c} \text{halogen} \\ | \\ \text{H}_3\text{C—CO—C—CO.CH}_3 \\ | \\ \text{CH}_2\text{—CH}_2\text{—O—acyl} \end{array}$$

wherein "acyl" is the radical of a carboxyacyl acid with a lower alcohol and a small quantity of water and sulfuric acid.

5. The process of producing 2-methyl-2-alkoxy-3-halogen-tetrahydrofuranes which comprises reacting upon a compound of the formula $$\begin{array}{c} \text{halogen} \\ | \\ \text{alkyl—O.OC—C—CO.CH}_3 \\ | \\ \text{CH}_2\text{—CH}_2\text{—O—acyl} \end{array}$$

wherein "acyl" is the radical of a carboxyacyl acid with a lower alcohol and a small quantity of water and a mineral acid.

6. The process of producing 2-methyl-2-alkoxy-3-halogen-tetrahydrofuranes which comprises reacting upon a compound of the formula $$\begin{array}{c} \text{halogen} \\ | \\ \text{alkyl—O.OC—C—CO.CH}_3 \\ | \\ \text{CH}_2\text{—CH}_2\text{—O—acyl} \end{array}$$

wherein "acyl" is the radial of a carboxyacyl acid with a lower alcohol and a small quantity of water and sulfuric acid.

7. The process of producing 2-methyl-2-alkoxy-3-halogen-tetrahydrofuranes which comprises reacting upon a compound of the formula $$\begin{array}{c} \text{halogen} \\ | \\ \text{R—C—CO.CH}_3 \\ | \\ \text{CH}_2\text{—CH}_2\text{—O—acyl} \end{array}$$

wherein R stands for a radical selected from the group consisting of the aceto and carbalkoxy groups and "acyl" is the radical of a carboxyacyl acid with ethanol and a small quantity of water and a mineral acid.

8. The process of producing 2-methyl-2-alkoxy-3-halogen-tetrahydrofuranes which comprises reacting upon a compound of the formula $$\begin{array}{c} \text{halogen} \\ | \\ \text{R—C—CO.CH}_3 \\ | \\ \text{CH}_2\text{—CH}_2\text{—O—acyl} \end{array}$$

wherein R stands for a radical selected from the group consisting of the aceto and carbalkoxy groups and "acyl" is the radical of a carboxyacyl acid with ethanol and a small quantity of water and sulfuric acid.

9. The process of producing 2-methyl-2-alkoxy-3-halogen-tetrahydrofuranes which comprises reacting upon a compound of the formula $$\begin{array}{c} \text{halogen} \\ | \\ \text{H}_3\text{C—OC—C—CO—CH}_3 \\ | \\ \text{CH}_2\text{—CH}_2\text{—O—acyl} \end{array}$$

wherein "acyl" is the radical of a carboxyacyl acid with ethanol and a small quantity of water and sulfuric acid.

10. The process of producing 2-methyl-2-alkoxy-3-halogen-tetrahydrofuranes which comprises reacting upon a compound of the formula $$\begin{array}{c} \text{halogen} \\ | \\ \text{alkyl—O.OC—C—CO—CH}_3 \\ | \\ \text{CH}_2\text{—CH}_2\text{—O—acyl} \end{array}$$

wherein "acyl" is the radical of a carboxyacyl acid with ethanol and a small quantity of water and sulfuric acid.

11. The process of producing 2-methyl-2-alkoxy-3-halogen-tetrahydrofuranes which comprises reacting upon a compound of the formula $$\begin{array}{c} \text{Cl} \\ | \\ \text{R—C—CO—CH}_3 \\ | \\ \text{CH}_2\text{—CH}_2\text{—O—acyl} \end{array}$$

wherein R stands for a radical selected from the group consisting of the aceto and carbalkoxy groups and "acyl" is the radical of a carboxyacyl acid with a lower alcohol and a small quantity of water and a mineral acid.

12. The process of producing 2-methyl-2-alkoxy-3-halogen-tetrahydrofuranes which comprises reacting upon a compound of the formula $$\begin{array}{c} \text{Cl} \\ | \\ \text{H}_3\text{C—OC—C—CO—CH}_3 \\ | \\ \text{CH}_2\text{—CH}_2\text{—O—acyl} \end{array}$$

wherein "acyl" is the radical of a carboxyacyl acid with a lower alcohol and a small quantity of water and a mineral acid.

13. The process of producing 2-methyl-2-alkoxy-3-halogen-tetrahydrofuranes which comprises reacting upon a compound of the formula $$\begin{array}{c} \text{Cl} \\ | \\ \text{alkyl—O—OC—C—CO—CH}_3 \\ | \\ \text{CH}_2\text{—CH}_2\text{—O—acyl} \end{array}$$

wherein "acyl" is the radical of a carboxyacyl acid with a lower alcohol and a small quantity of water and a mineral acid.

14. The process of producing 2-methyl-2-alkoxy-3-halogen-tetrahydrofuranes which comprises reacting upon a compound of the formula

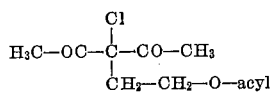

wherein "acyl" is the radical of a carboxyacyl acid with an alcohol and a small quantity of water and sulfuric acid.

15. The process of producing 2-methyl-2-alkoxy-3-halogen-tetrahydrofuranes which comprises reacting upon a compound of the formula

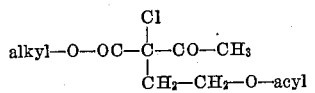

wherein "acyl" is the radical of a carboxyacyl acid with an alcohol and a small quantity of water and sulfuric acid.

KURT WESTPHAL.
HANS ANDERSAG.